(12) United States Patent
Kiriazis et al.

(10) Patent No.: US 6,403,192 B1
(45) Date of Patent: *Jun. 11, 2002

(54) FILMS PROVIDED WITH SEVERAL COATING LAYERS AND THE USE THEREOF IN AUTOMOBILE MANUFACTURING

(75) Inventors: Leonidas Kiriazis; Egon Wegner, both of Münster (DE)

(73) Assignee: BASF Coatings AG, Muenster-Hiltrup (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/510,628

(22) Filed: Feb. 19, 2000

Related U.S. Application Data

(62) Division of application No. 08/945,669, filed on Mar. 10, 1998, now Pat. No. 6,132,864.

(51) Int. Cl.$^7$ .................................................. B32B 3/10
(52) U.S. Cl. .......................... 428/46; 156/235; 156/246; 156/196
(58) Field of Search ............................ 428/46; 156/235, 156/246, 196

(56) References Cited

U.S. PATENT DOCUMENTS 6,132,864 A * 10/2000 Kiriazis et al. ............. 428/337

* cited by examiner

*Primary Examiner*—Merrick Dixon

(57) ABSTRACT

The present invention concerns films provided with several layers, characterised by the fact that: (A) the surface of a 10–500 $\mu$m thick plastic film is coated optinally with a filler composition layer; (B) the surface of the plastic film or filler layer is given at least one pigmented lacquer layer; (C) the pigmented lacquer layer is optionally coated with a transparent plastic film.

13 Claims, No Drawings

FILMS PROVIDED WITH SEVERAL COATING LAYERS AND THE USE THEREOF IN AUTOMOBILE MANUFACTURING

This application is a division of Ser. No. 08/945,669 filed Mar. 10, 1998 now U.S. Pat. No. 6,132,864.

The present invention relates to films coated with two or more coating layers, to a process for preparing these films, and to the use of the films in automobile manufacturing EP-A-374 551 discloses coated substrates which are suitable for producing add-on parts for car bodies. The coated substrates described in EP-A-374 551 consist of metal panels which have been coated with at least one paint coat or of composite materials whose surface layer consists of the coated metal panels.

P4424290.9 discloses substrates coated with two or more coats. These substrates are deformed and are processed further if desired with the aid of additional materials. In this way it is possible to produce add-on parts for vehicle bodies.

The object of the present invention was to provide films, coated with two or more coating layers, which can be applied to shaped-part blanks, preferably metal panels prior to their deformation, which have improved properties following the deformation of the blanks, relative to the coated substrates disclosed in EP-A-374 551, and in whose preparation only small amounts of solvent are emitted and simple quality monitoring is possible.

This object is achieved in accordance with the invention by the provision of films coated with two or more coating layers, wherein.

A the surface of a plastic film having a thickness of from 10 to 500 $\mu$m is coated if desired with a filler compositionlayer, B the surface of the plastic film, or the filler layer, is coated with at least one pigmented lacquer layer, C the pigmented lacquer layer is coated if desired with a transparent plastic film.

A film which can be peeled off is applied if desired onto the transparent plastic film and/or the pigmented lacquer layer and/or the uncoated side of the base film.

The present invention also relates to a process for preparing a film coated with two or more coating layer, which comprises A coating the surface of a plastic film having a thickness of from 10 to 500 $\mu$m, if desired, with a filler composition suitable for coating car bodies, B coating the surface of the plastic film, or the filler layer, with at least one pigmented lacquer layer, C if desired, coating the pigmented lacquer layer, if appropriate, with a transparent plastic film, and D curing the pigmented lacquer layer applied to the surface of the plastic film or the filler layer applied to the surface of the plastic film.

In this process, the curing of the filler layer applied in step A can be carried out before overcoating with at least one pigmented laquer layer, and the curing of the pigmented lacquer layer applied in step B can be carried out before applying the transparent plastic film. If desired, a protective film which can be peeled off can be applied after step C or D.

A further subject of the present invention is the use of the novel coated films for coating shaped-part blanks to produce vehicle bodies, preferably car bodies, and to produce build-on parts for vehicle bodies. Consequently, it is preferred in accordance with the invention to employ coating materials and filler compositions which are suitable for car bodies, provided they have sufficient flexibility for the purposes of the invention, i.e. provided the cured coating systems have T-bend values of $\leq 3.0$, preferably $\leq 2.0$ and, with particular preference, $\leq 1.0$.

The car bodies coated with the novel films are notable for very high resistance to stone chipping and corrosion. Further advantages of the novel coated films are that they can be produced on installations requiring little space. Moreover, owing to the use of painted plastic films for the coating of bodywork, only very small amounts of organic solvent are emitted. Advantageously, therefore, quality monitoring begins with the painted plastic film, whereas in the case of conventional painting of metal panels the quality of the coating cannot be assessed until after the application of the coating layers to the substrate, and in the case of quality defects the coated substrate as a whole has to be discarded.

In the preparation of the novel films it is primarily thermoplastics which are suitable. In step A it is possible to employ a film made from a polyolefin, a polyamide, a polyurethane, a polyester, a polyacrylate, a polycarbonate or a mixture of different polymeric substances. The plastic film employed in step A has a thickness of 10–500, preferably 20–250 $\mu$m and may comprise dyes and/or pigments.

Corresponding materials can also be employed as a film which can be peeled off.

Insofar as the plastic film is employed for use for vehicle bodies and for that purpose is additionally to be coated with a filler composition, it is preferred to use filler compositions which are suitable for the coating of car bodies. Here too, there must be sufficient flexibility for the purposes of the invention. In accordance with the invention this flexibility can be controlled by way of the degree of crosslinking.

In the conventional painting of car bodies, the primer applied by electrodeposition is overcoated with a filler composition. The filler layer obtained in this way has essentially two functions: on the one hand, it is intended to compensate for the unevennesses of the electrodeposition primer and, on the other hand, it is intended to improve the stone-chip resistance of the overall coating. The filler compositions consist essentially of a binder, a crosslinking agent, pigments and fillers and, if desired, further additives, for example crosslinking catalysts and leveling assistants.

The filler compositions which can be employed may comprise as binder, for example, epoxy resins, polyester resins, polyurethane resins, polyacrylate resins and alkyd resins or combinations of such resins. As crosslinking agent the filler compositions which can be employed may comprise amino resins, for example melamine-formaldehyde resins, amines, polyisocyanates and carboxyl-containing compounds. Examples of pigments which may be present in the filler compositions which can be employed are titanium dioxide, phthalocyanines, iron oxides and carbon black. Fillers which can be present in the filler compositions are, for example, lime or barium sulfate.

The shaped parts coated with the novel films, for example car bodies, surprisingly have a good resistance to stone chipping even when no filler composition is applied in step A.

In step B, at least one pigmented lacquer layer is applied to the surface of the plastic film or to the filler layer which is obtained after step A has been carried out.

For this purpose it is possible to use any base coat or top coat suitable for the conventional painting of car bodies. A prerequisite here too, however, is good flexibility of the cured coating, without the loss of resistance to stone chipping and corrosion. Coating materials of this kind are well known to the skilled worker. They essentially comprise a polymeric binder, with or without a crosslinking agent, and a pigment or mixture of pigments.

The top coat or base coat employed in step B can comprise as binder, for example, a polyester resin, a polyurethane resin or a polyacrylate resin or a mixture of such binders. As crosslinking agent the top coat or base coat can comprise an amino resin, a polyisocyanate resin, a carboxyl-containing crosslinking agent or a mixture of such crosslinking agents. Examples of pigments which may be present in the pigmented top coat or base coat applied in step B are titanium dioxide, phthalocyanine pigments, carbon black, iron oxide pigments, aluminum flake pigments and pearlescent pigments.

In step C, a transparent plastic film is applied to the paint coat applied in step B. It is possible here in principle to employ the materials which are also suitable for the base film.

In step D, the pigmented lacquer layer applied to the surface of the plastic film, or the pigmented laquer layers applied to the surface of the plastic film, is or are cured, in which case the curing of the filler layer applied in step A can be carried out before overcoating with at least one pigmented lacquer layer, and the curing of the pigmented lacquer layer applied in step B can be carried out before coating with the transparent plastic film. It is also possible to overcoat the filler layer applied in step A, in the uncured state, with a pigmented lacquer layer and then to cure filler layer and pigmented lacquer layer together before applying the transparent plastic film. The lacquer layers are normally cured by heating at temperatures from 60 to 230° C. On such heating there is a reaction between the binders and crosslinking agents present in the paints, and three-dimensional polymer networks are formed which give the paint surface a particularly high resistance to mechanical or chemical attack.

The lacques can be applied, for example, by spraying, roller coating or knife coating.

The films coated in accordance with the invention can be rolled up. As a result, the products can be sold and supplied in the form of rolls. For this reason, the coating materials employed in accordance with the invention must have a flexibility sufficient for rolling up.

The films can be applied in principle to all shaped-part blanks, preferably metal panels suitable for producing vehicle bodies, build-on parts for vehicle bodies, domestic appliances, for example refrigerators, washing machines and dishwashers. The films are applied predominantly to pretreated metal panels. These can have been pretreated, for example, by phosphating and/or chromating.

The coated plastic films prepared as described above can be laminated onto the surface of a shaped-part blank, i.e. of a substrate which has not yet been deformed, preferably metal sheet. In this case the film can first be laminated onto the undeformed substrate which can then be deformed and, finally, coated.

The metal sheet can be coated in succession with a plastic film, a filler layer if desired, a pigmented lacquer layer and, if desired, a transparent plastic film. From the metal sheet coated in this way, which can be stored and supplied in roll form, automotive parts are cut out and shaped.

Alternatively, the plastic film is first of all coated in succession with a filler layer, if desired, with a pigmented lacqued layer and, if desired, with a transparent plastic film. This coat system is laminated onto a metal sheet from which automotive parts are produced by cutting out and forming. The requirements regarding the flexibility of the coating materials employed must, consequently, also be oriented toward the above-described application techniques.

Adhesion to the surface which is to be coated can be brought about in various ways. One possibility, for example, is to employ films having adhesion-promoting groups, for example urethane groups, acid anhydride groups or carboxyl groups, or films which have been provided with adhesion-promoting groups by coextrusion with a polymer which contains adhesion-promoting groups. Adhesion between the film and the surface to be coated can also be achieved by using an adhesive. In this case it is possible to employ both adhesives which are solid at room temperature and adhesives which are liquid at room temperature.

When applying films having adhesion-promoting groups by lamination, the substrate is generally covered with the film such that the adhesion promoter layer contacts the surface which is to be coated. By applying pressure and heat the film is then laminated onto the surface which is to be coated. The pressure and temperature here should be chosen so as to give a firm bond between the substrate and the film. When using adhesives which are solid at room temperature, the procedure is similar. If liquid adhesives are employed, the procedure is generally that the liquid adhesive is applied to the substrate and the coated plastic film is laminated onto the heated substrate that has been coated with the adhesive.

The invention is illustrated in more detail in the working examples below. All percentages and parts are to be understood as being by weight unless expressly stated otherwise.

EXAMPLE 1

A white pigmented thermoplastic polyurethane film 60 $\mu$m thick (Elastollan® EL 1184A from Elastogran GmbH) is fixed on a metal sheet and coated with a customary commercial white pigmented nonaqueous top coat (dry film thickness: 20 $\mu$m). The base coat is baked at 130° C. for 30 minutes. A transparent polyester film (Melinex®, ICI), which has been provided with a 20-$\mu$m thick adhesion promoter layer comprising a polyester based on 1,4-butanediol and terephthalic/isophthalic acid (1:1) is pressed onto the coated side of the film coated in this way, at a temperature of 150° C. and a pressure of 25 bar. The resulting laminate is detached from the metal base and laminated at a temperature of 220° C. and a pressure of 50 bar onto a bodywork panel (Bonder 2660 OC).

EXAMPLE 2

The adhesion promoter layer of a white pigmented, thermoplastic polyurethane film 60 $\mu$m thick (Elastollan® EL 1184A from Elastogran GmbH) which has been provided with a 20-$\mu$m thick adhesion promoter layer comprising a polyester based on 1,4-butanediol and terephthalic/isophthalic acid (1:1) is covered with a release paper. The side of the film which has not been covered is then coated with a customary commercial white pigmented nonaqueous paint (dry film thickness: 20 $\mu$m). The base coat is baked at 130° C. for 30 minutes. A transparent polyester film (Melinex®, ICI) which has been provided with a 20-$\mu$m thick adhesion promoter layer comprising a polyester based on 1,4-butanediol and terephthalic/isophthalic acid (1:1) is pressed onto the coated side of the film coated in this way, at a temperature of 150° C. and a pressure of 25 bar. After removing the release paper, the resulting laminate is laminated at a temperature of 220° C. and a pressure of 50 bar onto a bodywork panel (bonder 2660 OC).

Testing the Coated Substrates

The coated substrates produced in accordance with Examples 1 and 2 showed excellent resistance values both in the VDA [German Automakers' Association] stone chip test (2×500 g at 2 bar) and in the Mercedes Benz ball shot test (VDA: rating 1; ball shot test: degree of rusting=0, degree of flaking: $\leq 2$ mm$^2$). To test the corrosion resistance, the coated substrates were scribed with a slit about 10 cm long extending down to the metal panel, and were subjected to a salt spray test in accordance with DIN 50 021. After 6 weeks no scribe creep was evident.

What is claimed is:

1. A film coated with two or more coating layers, comprising

A a plastic base film having a surface and a thickness of from 10 to 500 μm,

B at least one pigmented paint coat coated on the surface of the plastic film,

C a transparent plastic film coated on the pigmented paint coat.

2. The film of claim 1, wherein a plastic film which can be peeled off is applied over an uncoated side of the plastic film.

3. The film of claim 1, wherein the transparent plastic film is resistant to UV light.

4. The film of claim 1, wherein an adhesion promoter layer is arranged between the transparent plastic film and the paint coat.

5. The film of claim 1, wherein the plastic base film is a thermoplastic polyolefin film or a thermoplastic polyurethane film.

6. The film of claim 1, further comprising a filler composition coated on the plastic base film.

7. A process for preparing a film coated with two or more coats, comprising

A coating a surface of a plastic base film having a thickness of from 10 to 500 μm, B overcoating the surface of the plastic base film, with at least one pigmented paint coat, C coating the pigmented paint coat, with a transparent plastic film, and D curing the applied paint coats.

8. The process of claim 7, further comprising a filler coat coated on the surface of the plastic base film.

9. The process of claim 7, wherein a plastic film which can be peeled off is applied after step C.

10. The process of claim 7, wherein the plastic base film of step A comprises a film selected from the group consisting of thermoplastic polyolefin film, thermoplastic polyurethane film and mixtures thereof.

11. A process for producing moldings coated with the film of claim 1, comprising providing a substrate, A cating the substrate with a plastic film having a thickness of 10–500 μm and a surface, B coating the surface of the plastic film with at least one pigmented paint coat, C coating the pigmented paint coat with a transparent plastic firm, D curing the applied paint coats and E producing moldings from the substrate coated in this way.

12. The process of claim 11 further comprising laminating the coated film onto a substrate.

13. A process for producing moldings coated with the film of claim 1, which comprises A laminating a plastic base film having a thickness of from 10 to 500 μm onto a substrate, B producing moldings from the substrate coated in this way, C coating the surface of the plastic base film, D overcoating the surface of the plastic base film with at least one pigmented paint coat, E coating the pigmented paint coat, with a transparent plastic film, and F curing the applied paint coats.

* * * * *